(12) United States Patent
Li et al.

(10) Patent No.: US 12,065,358 B2
(45) Date of Patent: Aug. 20, 2024

(54) ZSM-5 MOLECULAR SIEVE AND PREPARATION METHOD AND USE THEREOF

(71) Applicant: Beijing University of Chemical Technology, Beijing (CN)

(72) Inventors: Feng Li, Beijing (CN); Jindong Ji, Beijing (CN); Guoli Fan, Beijing (CN)

(73) Assignee: Beijing University of Chemical Technology

( * ) Notice: Subject to any disclaimer, the term of this patent is extended or adjusted under 35 U.S.C. 154(b) by 0 days.

(21) Appl. No.: 17/857,952

(22) Filed: Jul. 5, 2022

(65) Prior Publication Data

US 2023/0278878 A1 Sep. 7, 2023

(30) Foreign Application Priority Data

Mar. 4, 2022 (CN) .......................... 202210206931.1

(51) Int. Cl.
*C01B 39/38* (2006.01)
(52) U.S. Cl.
CPC .................................... *C01B 39/38* (2013.01)
(58) Field of Classification Search
CPC .......... C01B 39/38; C01B 39/40; B01J 29/40; B01J 35/002; B01J 35/023; B01J 35/1019; B01J 35/1057; B01J 35/1061; B01J 37/10; B01J 37/036; Y02P 20/52
USPC ............. 502/60, 77; 423/700, 701, 702, 704
See application file for complete search history.

(56) References Cited

U.S. PATENT DOCUMENTS

2011/0270010 A1* 11/2011 Hayasaka ............... C10G 45/64
502/77
2020/0047168 A1* 2/2020 Hotta ..................... B01J 37/086

FOREIGN PATENT DOCUMENTS

CA 2 702 514 * 4/2009

* cited by examiner

*Primary Examiner* — Coris Fung
*Assistant Examiner* — Keling Zhang
(74) *Attorney, Agent, or Firm* — Smith Gambrell & Russell LLP; Judy Jarecki-Black; Sharon Ngwenya

(57) ABSTRACT

Disclosed are a ZSM-5 molecular sieve and a preparation method and use thereof. In this disclosure, a silicon source, an aluminum source, sodium hydroxide, a template and water are mixed in a rotating micro liquid membrane reactor, and then subjected to a hydrothermal crystallization to obtain the ZSM-5 molecular sieve.

8 Claims, 7 Drawing Sheets

ZSM-5 MOLECULAR SIEVE AND PREPARATION METHOD AND USE THEREOF

CROSS REFERENCE TO RELATED APPLICATION

This patent application claims the benefit and priority of Chinese Patent Application No. 202210206931.1, entitled "ZSM-5 molecular sieve and preparation method and use thereof" filed on Mar. 4, 2022, the disclosure of which is incorporated by reference herein in its entirety as part of the present application.

TECHNICAL FIELD

The present disclosure relates to the technical field of molecular sieve preparation, in particular to a ZSM-5 molecular sieve and a preparation method and use thereof.

BACKGROUND ART

ZSM-5 molecular sieve has a relatively smaller specific surface area due to the lack of "cage" structure of other types of molecular sieves, but has a wider range of molar ratio of $SiO_2$ to $Al_2O_3$, which makes it possible to easily adjust the surface acidity and polarity thereof. Also, ZSM-5 molecular sieve has stable structural characteristics due to its high molar ratio of $SiO_2$ to $Al_2O_3$. Its internal structure does not collapse at 1200° C. and thus the original properties of the molecular sieve could be still maintained. Further, ZSM-5 molecular sieve has good shape selectivity. Thus, ZSM-5 molecular sieve is widely used in oil refining industry and petrochemical industry.

At present, methods for preparing a ZSM-5 molecular sieve mainly include, for example, a sol-gel method, an organic solvent method, and a hydrothermal method. Among them, hydrothermal method has advantages such as convenience, high cost-effectiveness, and being easy to scale up, and thus is the most widely used. Hydrothermal synthesis of ZSM-5 molecular sieve usually needs steps such as aging, crystallization, washing, drying, and roasting, and in particular, the aging process is often essential, because the purpose of the aging process is to promote the uniform mixing of molecular sieve precursors to produce more crystal nuclei during induction period, which is conducive to subsequent crystallization process. However, the traditional aging process under stirring often has problems of lacking effective control of the nucleation and growth processes of molecular sieve and having a limited stirring intensity, and thereby makes it difficult to obtain a uniform nucleation environment and uniform initial crystal nuclei, which adversely affects the particle size and particle size uniformity of ZSM-5 molecular sieve, and further adversely affects the properties such as pore structure of molecular sieve.

SUMMARY

In view of the above, an object of the present disclosure is to provide a ZSM-5 molecular sieve and a preparation method and use thereof. The method provided by the present disclosure makes it possible to prepare a ZSM-5 molecular sieve with good particle size uniformity and a structure rich in pores.

In order to achieve the above object, the present disclosure provides the following technical solutions:

The present disclosure provides a method for preparing a ZSM-5 molecular sieve, which comprises the following steps:

mixing a silicon source, an aluminum source, sodium hydroxide, a template and water in a rotating micro liquid membrane reactor to obtain an initial gel; and subjecting the initial gel to a hydrothermal crystallization obtain the ZSM-5 molecular sieve.

In some embodiments, in terms of active ingredients of $SiO_2$, $Al_2O_3$, $Na_2O$, the template and $H_2O$ in the initial gel, a molar ratio of $SiO_2$ to $Al_2O_3$ is in a range of 30:1 to 450:1, a molar ratio of $Na_2O$ to $Al_2O_3$ is in a range of 1.5:1 to 42.3:1, a molar ratio of the template to $Al_2O_3$ is in a range of 2.1:1 to 28:1, and a molar ratio of $H_2O$ to $Al_2O_3$ is in a range of 2000:1 to 16000:1.

In some embodiments, the template includes tetrapropylammonium hydroxide.

In some embodiments, the mixing of the silicon source, the aluminum source, sodium hydroxide, the template and water in a rotating micro liquid membrane reactor is performed by a first mixing of the aluminum source, sodium hydroxide, the template and water to obtain an aluminum source mixed solution, and introducing the aluminum source mixed solution and the silicon source into the rotating micro liquid membrane and performing a second mixing.

In some embodiments, each of the aluminum source mixed solution and the silicon source independently has a flow rate of 30-200 ml/min.

In some embodiments, the second mixing is performed at a rotational speed of 3000-6000 rpm for 2-10 min.

In some embodiments, the hydrothermal crystallization is performed at a temperature of 150-220° C. for 6-48 h.

The present disclosure provides a ZSM-5 molecular sieve prepared by the method described in the above technical solutions, which has a specific surface area of 350-450 m²/g, a particle size of 0.5-2.5 μm, and an average pore size of 1.5-3 nm.

In some embodiments, the ZSM-5 molecular sieve has a molar ratio of $SiO_2$ to $Al_2O_3$ of 30-450.

The present disclosure provides use of the ZSM-5 molecular sieve described in the above technical solutions as a catalyst.

The present disclosure provides a method for preparing a ZSM-5 molecular sieve, comprising the steps of mixing a silicon source, an aluminum source, sodium hydroxide, a template and water in a rotating micro liquid membrane reactor to obtain an initial gel; and subjecting the initial gel to a hydrothermal crystallization obtain the ZSM-5 molecular sieve. The nucleation process plays an important role in the formation of a uniform particle size distribution and a small particle size of molecular sieve. By using the rotating micro liquid membrane reactor for mixing, the present disclosure provides an environment with a considerable shear force, which greatly strengthens the micromixing effect of various preparation raw materials of molecular sieve, provides a uniform nucleation environment and improves the uniformity of initial crystal nuclei, and thereby drives the subsequent nucleation-crystallization process of molecular sieve with a smaller particle size and better uniformity. A large number of bubbles could be produced during the mixing process in the rotating micro liquid membrane reactor. The existence of bubbles makes it possible to reduce the activation energy barrier of nucleation and reduce the size of critical nuclei, so that bubbles could be used as seeds to provide more crystal nuclei. Furthermore, the number of structural units in the initial gel is constant; when the number of crystal nuclei is increased, the structural units needed for crystal growth are reduced, resulting in a greatly reduced crystal size of the ZSM-5 molecular sieve. Moreover, under the dynamic control of bubble effect, a polycondensation reaction between [$SiO_4$] and [$AlO_4$] tetrahedrons occurs during the subsequent hydrothermal crystallization process, forming crystal nuclei with coexistence of microporous and mesoporous, and crystals are grown to form a ZSM-5 molecular sieve with developed pore structure and coexistence of microporous and mesoporous. Meanwhile, the preparation method provided by the present disclosure has advantages of simple process, low energy consumption and low production cost, and is suitable for industrial production.

Further, the preparation method provided by the present disclosure does not need a long-time mixing, hydrolysis and nucleation process, and the subsequent hydrothermal crystallization could be carried out only after mixing for 2-10 min at 3000-6000 rpm, which involves a short mixing time. Moreover, the preparation method provided by the present disclosure does not need an aging step, has simple process and low energy consumption.

The present disclosure provides a ZSM-5 molecular sieve prepared by the method of the above technical solutions, which has a specific surface area of 350-450 m²/g, a particle size of 0.5-2.5 μm, and an average pore size of 1.5-3 nm. The ZSM-5 molecular sieve according to the present disclosure has a uniform composition, small particle size, good particle size uniformity, high specific surface area, coexistence of microporous and mesoporous, and developed pore structure, and has a good application prospect in catalytic field.

Further, the ZSM-5 molecular sieve according to the present disclosure has a wide silicon-to-aluminum ratio, which greatly widens the application of the molecular sieve.

DETAILED DESCRIPTION OF THE EMBODIMENTS

Figure 1:
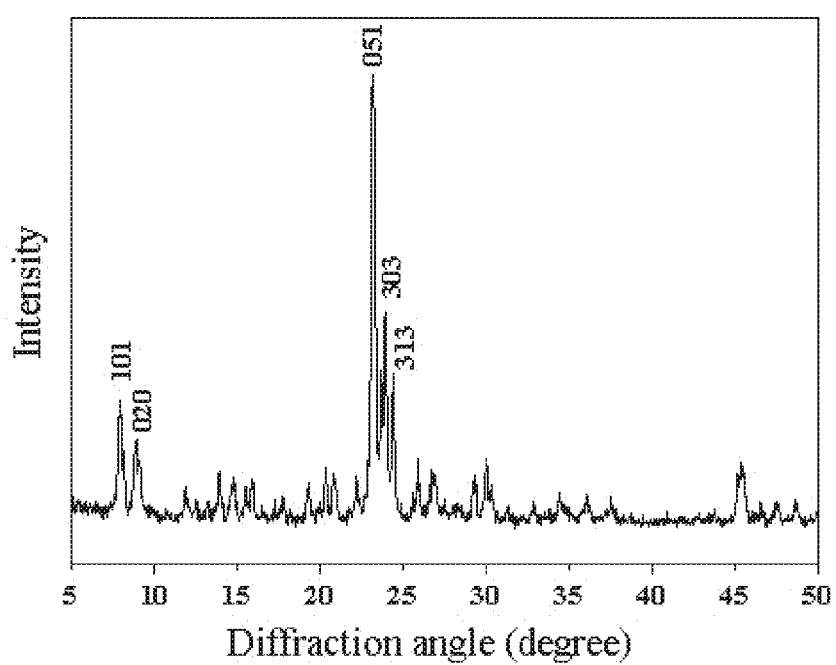
FIG. 1 shows X-ray diffraction (XRD) spectrum of ZSM-5-M-50.

The present disclosure provides a method for preparing a ZSM-5 molecular sieve, comprising the following steps:
mixing a silicon source, an aluminum source, sodium hydroxide, a template and water in a rotating micro liquid membrane reactor to obtain an initial gel; and subjecting the initial gel to a hydrothermal crystallization to obtain the ZSM-5 molecular sieve.

In the present disclosure, unless otherwise specified, all raw material components are commercially available goods well known to those skilled in the art.

In the present disclosure, the silicon source, the aluminum source, sodium hydroxide, the template and water are introduced into the rotating micro liquid membrane reactor and mixed to obtain the initial gel.

In some embodiments, the silicon source includes silica sol and/or tetraethyl silicate. In some embodiments, the silica sol has a solid content of 30-40 wt %, preferably 32-35 wt %.

In some embodiments, the aluminum source is an aluminum salt. In some embodiments, the aluminum source includes aluminum sulfate and/or sodium metaaluminate.

In the present disclosure, the template includes tetrapropylammonium hydroxide.

In some embodiments, in terms of active ingredients of $SiO_2$, $Al_2O_3$, $Na_2O$, the template and $H_2O$ in the initial gel, a molar ratio of $SiO_2$ to $Al_2O_3$ is in a range of 30:1 to 450:1, preferably 50:1 to 400:1, more preferably 100:1 to 300:1; a molar ratio of $Na_2O$ to $Al_2O_3$ is in a range of 1.5:1 to 42.3:1, preferably 5:1 to 40:1, more preferably 10:1 to 20:1; a molar ratio of the template to $Al_2O_3$ is in a range of 2.1:1 to 28:1, preferably 5:1 to 28:1, more preferably 10:1 to 25:1; and the molar ratio of $H_2O$ to $Al_2O_3$ is in a range of 2000:1 to 1600:1, preferably 3000:1 to 16000:1, more preferably 4000:1 to 16000:1.

In some embodiments, the mixing of the silicon source, the aluminum source, sodium hydroxide, the template and water in the rotating micro liquid membrane reactor is performed by a first mixing of the aluminum source, sodium hydroxide, the template and water to obtain an aluminum source mixed solution; and introducing the aluminum source mixed solution and the silicon source into the rotating micro liquid membrane and performing a second mixing to obtain the initial gel. In the present disclosure, there is no special limitation to the mode of the first mixing, and any mixing mode well known to those skilled in the art, such as mixing under stirring, may be used. In some embodiments, each of the aluminum source mixed solution and the silicon source independently has a flow rate of 30-200 ml/min, preferably 50-150 ml/min. In some embodiments, the second mixing is performed at a rotational speed of 3000-6000 rpm, preferably 4000-5000 rpm. In some embodiments, the second mixing is performed for 2-10 min, preferably 5-8 min. In some embodiments, the introducing is carried out by a peristaltic pump.

After obtaining the initial gel, the initial gel is then subjected to a hydrothermal crystallization to obtain the ZSM-5 molecular sieve. In some embodiments, the hydrothermal crystallization is performed at a temperature of 150-220° C., preferably 160-210° C., more preferably 180-200° C. In some embodiments, the hydrothermal crystallization is performed for 20-30 h. In the present disclosure, there is no special limitation to the equipment for the hydrothermal crystallization, and any equipment for the hydrothermal crystallization well known in the art may be used. In some embodiments of the present disclosure, the hydrothermal crystallization is carried out in a polytetrafluoroethylene lined autoclave.

In some embodiments, the method for preparing a ZSM-5 molecular sieve further comprises after the hydrothermal crystallization, subjecting a system obtained from the hydrothermal crystallization to a solid-liquid separation to obtain a solid, and washing the solid with water and drying to obtain the ZSM-5 molecular sieve. In the present disclosure, there is no special limitation to the manner for the solid-liquid separation, and any manner for solid-liquid separation well known in the art, such as filtration, suction filtration or centrifugal separation, may be used. In the present disclosure, there is no special limitation to the number of times of washing with water, as long as the filtrate could be neutral. In some embodiments, the drying is performed at a temperature of 60-80° C., preferably 70° C. In the present disclosure, there is no special limitation to the time for drying, as long as the resulting solid material could be dried to a constant weight.

In traditional hydrothermal synthesis routes, the formation of particles mainly comprises two stages of nucleation and crystal growth. In such process, various structural units and templates interacting with each other in the initial gel could determine the nucleation and growth of the molecular sieve. Meanwhile, the morphology, pore structure and acidity of molecular sieve are important physical properties, which are directly related to the molecular diffusion, shape selectivity and active site distribution of the catalyst in a catalytic reaction process, and directly affect the selectivity and stability of molecular sieve catalyst. In the nucleation process of molecular sieve, the uniformity of various reaction species affects the assembly of structural units, thus affecting the size, quantity and composition of crystal nuclei. According to the Ostwald ripening mechanism, small crystal nuclei will grow at the cost of large crystal nuclei. Therefore, the morphology, pore structure and acidity of the final crystals are closely related to the uniformity of the initial nuclei. In the present disclosure, the environment with a considerable shear force provided by the rotating micro liquid membrane reactor is utilized to greatly strengthen the micromixing effect of molecular sieve precursors, which could provide a uniform nucleation environment and lead to uniform initial crystal nuclei, and thereby drives the nucleation crystallization process of molecular sieve with a smaller particle size and better uniformity. Moreover, the preparation method provided by the present disclosure does not need a long-time mixing, hydrolysis and nucleation process, nor an aging step, has simple process, low energy consumption and low production cost, and is suitable for industrial production.

The present disclosure provides a ZSM-5 molecular sieve prepared by the method of the above technical solutions. In the present disclosure, the ZSM-5 molecular sieve has a specific surface area of 350-450 m$^2$/g, preferably 380-420 m$^2$/g; a micropore pore diameter of 0.3-0.7 nm, preferably 0.4-0.6 nm; a mesoporous pore diameter of 2-30 nm, preferably 5-15 nm; a particle size of 0.5-2.5 μm, preferably 1-2 μm; an average pore diameter of 1.5-3 nm, preferably 1.8-2.5 nm. In some embodiments, the ZSM-5 molecular sieve has a molar ratio of SiO$_2$ to Al$_2$O$_3$ of 30-450, preferably 50-400.

The present disclosure provides use of the ZSM-5 molecular sieve described in the above technical solutions as a catalyst.

The technical solutions of the present disclosure will be clearly and completely described below in conjunction with the examples. Obviously, the described examples are only part, not all of examples of the present disclosure. All other examples obtained by those skilled in the art based on the examples described herein without paying creative work are within the scope of the present disclosure.

Example 1

0.01 mol of aluminum sulfate, 0.2 mol of sodium hydroxide, 0.14 mol of tetrapropylammonium hydroxide (R), and 40 mol of water were stirred and mixed to be uniform to obtain an aluminum source mixed solution. The aluminum source mixed solution (at a flow rate of 30 ml/min) and silica sol (0.5 mol in terms of SiO$_2$; at a flow rate of 200 ml/min) were introduced into a rotating micro liquid membrane reactor at the same time by a peristaltic pump, fully stirred at a speed of 5000 rpm for 3 min, then placed in a polytetrafluoroethylene lined autoclave, and subjected to a hydrothermal crystallization at 180° C. for 24 h. The resulting system was centrifuged, and the obtained solid product was washed with water until that the filtrate had a pH value of 7, and dried at 60° C. to a constant weight, obtaining a ZSM-5 molecular sieve (marked as ZSM-5-M-50). The ZSM-5-M-50 has a microporous and mesoporous structure, a particle size of about 1 μm, a monodisperse morphology and a uniform particle size, a specific surface area of 376 m$^2$/g, a micropore pore diameter of 0.57 nm, a mesoporous pore diameter of 3.89 nm, an average pore diameter of 2.24 nm, and a molar ratio of SiO$_2$ to Al$_2$O$_3$ of 50.

Comparative Example 1

0.01 mol of aluminum sulfate, 0.2 mol of sodium hydroxide, 0.14 mol of tetrapropylammonium hydroxide, and 40 mol of water were stirred and mixed to be uniform to obtain an aluminum source mixed solution. The aluminum source mixed solution and 0.5 mol of silica sol (in terms of SiO$_2$) were added to a three-necked flask at the same time, stirred at a speed of 3000 rpm for 2 h, to obtain an initial gel. The initial gel was placed in a polytetrafluoroethylene lined autoclave, and subjected to a hydrothermal crystallization at 180° C. for 24 h. The resulting system was centrifuged, and the obtained solid product was washed with water until that the filtrate had a pH value of 7, and dried at 60° C. to a constant weight, obtaining a ZSM-5 molecular sieve (marked as ZSM-5-S-50). The ZSM-5-S-50 has a microporous structure, a particle size of 1-3 μm, a poor uniformity of particle size, a specific surface area of 352 m$^2$/g, a micropore pore diameter of 0.57 nm, and a molar ratio of SiO$_2$ to Al$_2$O$_3$ of 50.

Example 2

0.005 mol of sodium metaaluminate, 0.1 mol of sodium hydroxide, 0.1 mol of tetrapropylammonium hydroxide, and 10 mol of water were stirred and mixed to be uniform to obtain an aluminum source mixed solution. The aluminum source mixed solution (at a flow rate of 50 ml/min) and silica sol (0.5 mol, in terms of SiO$_2$; at a flow rate of 65 ml/min) were introduced into a rotating micro liquid membrane reactor at the same time by a peristaltic pump, fully stirred at a speed of 4000 rpm for 5 min, then placed in a polytetrafluoroethylene lined autoclave, and subjected to a hydrothermal crystallization at 160° C. for 48 h. The resulting system was centrifuged, and the obtained solid product was washed with water until that the filtrate had a pH value of 7, and dried at 70° C. to a constant weight, obtaining a ZSM-5 molecular sieve (marked as ZSM-5-M-200). The ZSM-5-M-200 has a microporous and mesoporous structure, a particle size of about 1.5 μm, a dispersed morphology and a uniform particle size, a specific surface area of 420 m$^2$/g, a micropore pore diameter of 0.57 nm, a mesoporous pore diameter of 3.91 nm, an average pore diameter of 2.38 nm, and a molar ratio of SiO$_2$ to Al$_2$O$_3$ of 200.

Comparative Example 2

0.005 mol of sodium metaaluminate, 0.1 mol of sodium hydroxide, 0.1 mol of tetrapropylammonium hydroxide, and 10 mol of water were stirred and mixed to be uniform to obtain an aluminum source mixed solution. The aluminum source mixed solution and 0.5 mol of silica sol (in terms of $SiO_2$) were added to a three-necked flask at the same time, stirred at a speed of 3000 rpm for 2 h, to obtain an initial gel. The initial gel was placed in a polytetrafluoroethylene lined autoclave, and subjected to a hydrothermal crystallization at 160° C. for 48 h. The resulting system was centrifuged, and the obtained solid product was washed with water until that the filtrate had a pH value of 7, and dried at 70° C. to a constant weight, obtaining a ZSM-5 molecular sieve (marked as ZSM-5-S-200). The ZSM-5-S-200 has a microporous structure, a particle size of 1.5-9 μm, a poor uniformity of particle size, a specific surface area of 390 $m^2/g$, a micropore pore diameter of 0.57 nm, and a molar ratio of $SiO_2$ to $Al_2O_3$ of 200.

Example 3

0.001 mol of aluminium sulfate, 0.02 mol of sodium hydroxide, 0.028 mol of tetrapropylammonium hydroxide, and 16 mol of water were stirred and mixed to be uniform to obtain an aluminum source mixed solution. The aluminum source mixed solution (at a flow rate of 40 ml/min) and 0.4 mol of tetraethyl orthosilicate (at a flow rate of 120 ml/min) were introduced into a rotating micro liquid membrane reactor at the same time by a peristaltic pump, fully stirred at a rotation speed of 6000 rpm for 10 min, then placed in a polytetrafluoroethylene lined autoclave, and subjected to a hydrothermal crystallization at 200° C. for 12 h. The resulting system was centrifuged, and the obtained solid product was washed with water until that the filtrate had a pH value of 7, and dried at 80° C. to a constant weight, obtaining a ZSM-5 molecular sieve (marked as ZSM-5-M-400). The ZSM-5-M-400 has a microporous and mesoporous structure, a particle size of about 2 μm, a dispersed morphology and a uniform particle size, a specific surface area of 385 $m^2/g$, a micropore pore diameter of 0.57 nm, a mesoporous pore diameter of 3.87 nm, an average pore diameter of 1.96 nm, and a molar ratio of $SiO_2$ to $Al_2O_3$ of 400.

Comparative Example 3

0.001 mol of aluminium sulfate, 0.02 mol of sodium hydroxide, 0.028 mol of tetrapropylammonium hydroxide, and 16 mol of water were stirred and mixed to be uniform to obtain an aluminum source mixed solution. The aluminum source mixed solution and 0.4 mol of tetraethyl orthosilicate were added to a three-necked flask at the same time, stirred at a speed of 3000 rpm for 2 h, to obtain an initial gel. The initial gel was placed in a polytetrafluoroethylene lined autoclave, and subjected to a hydrothermal crystallization at 200° C. for 12 h. The resulting system was centrifuged, and the obtained solid product was washed with water until that the filtrate had a pH value of 7, and dried at 80° C. to a constant weight, obtaining a ZSM-5 molecular sieve (marked as ZSM-5-S-400). The ZSM-5-S-400 has a microporous structure, a particle size of 2-8 μm, a poor uniformity of particle size, a specific surface area of 350 $m^2/g$, a micropore pore diameter of 0.56 nm, and a molar ratio of $SiO_2$ to $Al_2O_3$ of 400.

FIG. 1 shows XRD spectrum of ZSM-5-M-50. As can be seen from FIG. 1, there is no impurity peak in XRD spectrum, and the ZSM-5 molecular sieve has good crystallinity and a typical MFI topological structure.

Figure 2A:
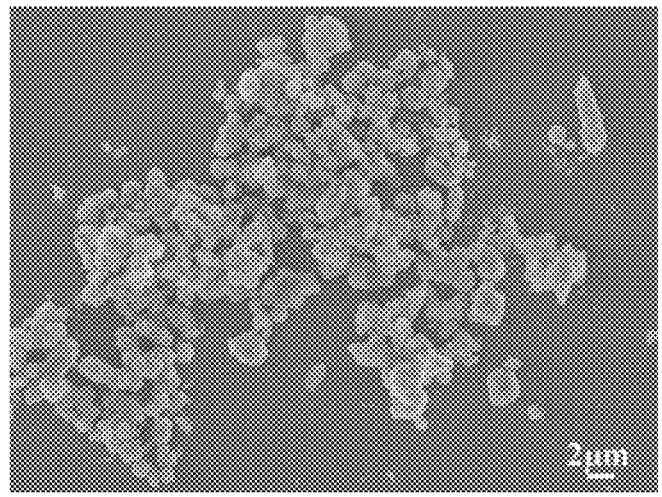
FIG. 2A shows a scanning electron microscope (SEM) image of ZSM-5-S-50.
Figure 2B:
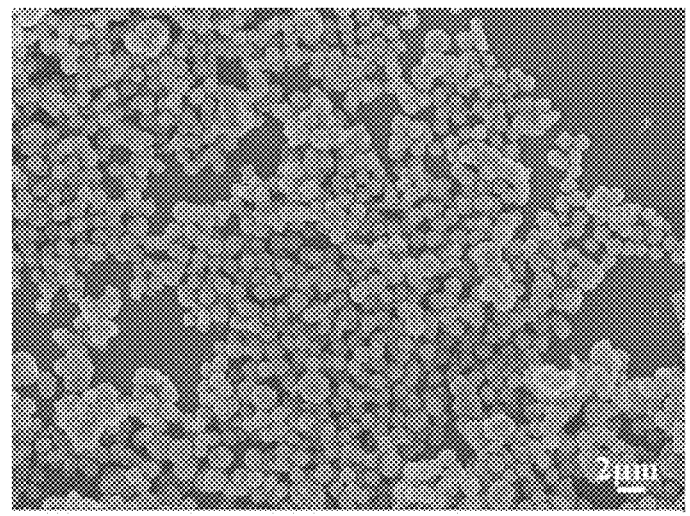
FIG. 2B shows a SEM image of ZSM-5-M-50.
Figure 3A:
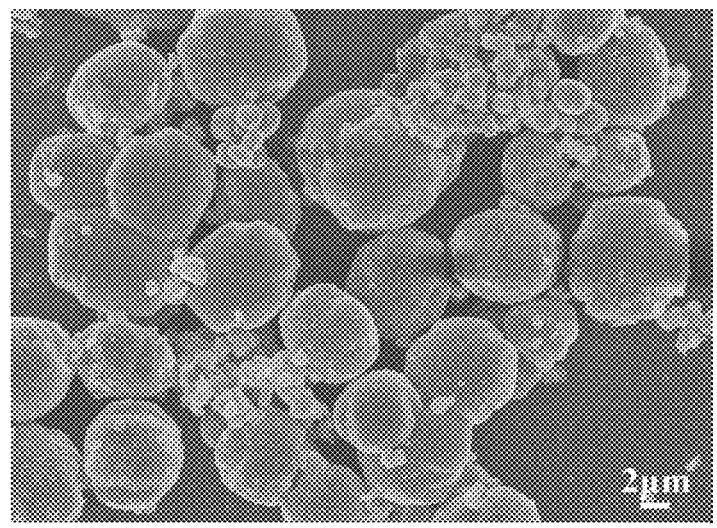
FIG. 3A shows a SEM image of ZSM-5-S-200.
Figure 3B:
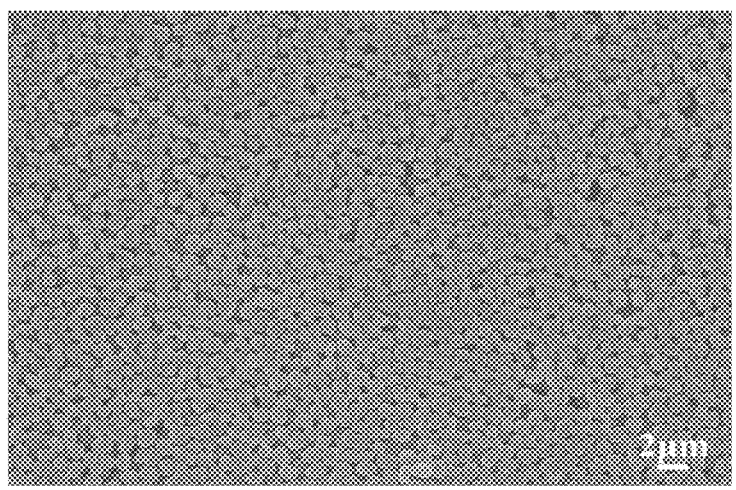
FIG. 3B shows a SEM image of ZSM-5-M-200.
Figure 4A:
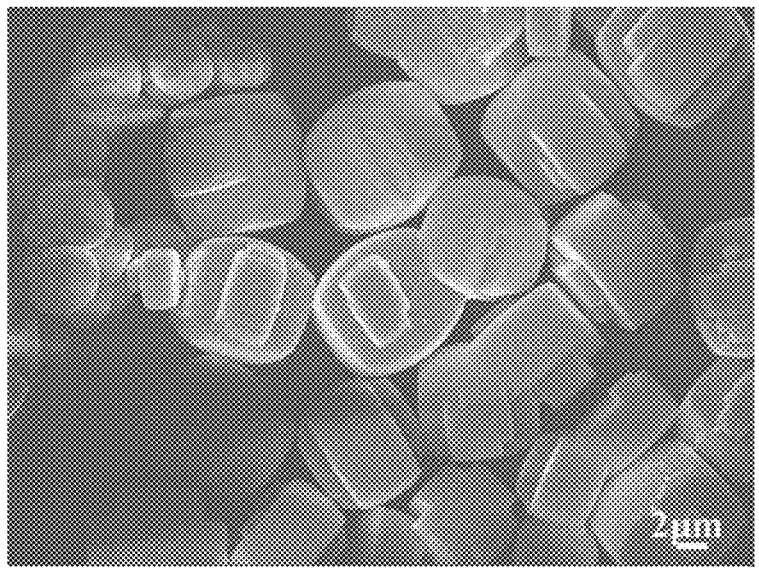
FIG. 4A shows a SEM image of ZSM-5-S-400.
Figure 4B:
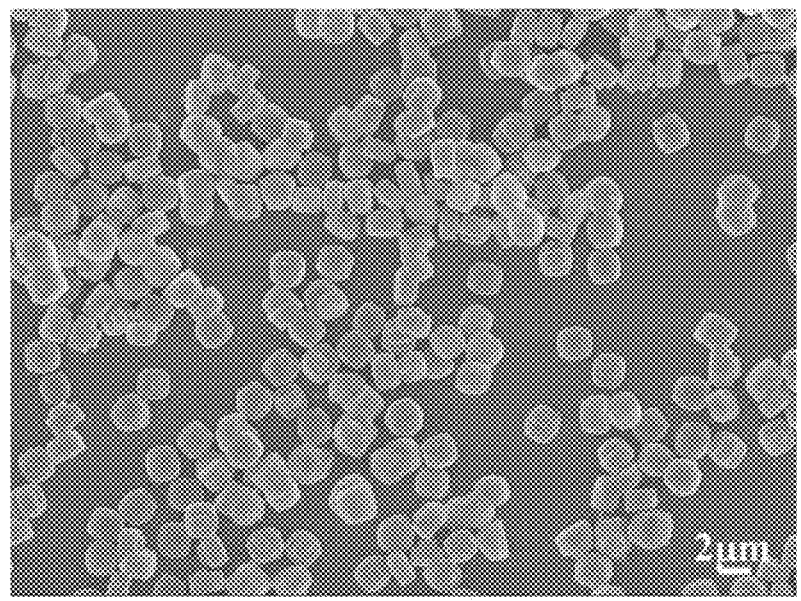
FIG. 4B shows a SEM image of ZSM-5-M-400.

FIGS. 2A and 2B show SEM images of ZSM-5-S-50 and ZSM-5-M-50 (both with a scale of 2 μm). FIGS. 3A and 3B show SEM images of ZSM-5-S-200 and ZSM-5-M-200 (both with a scale of 2 μm). FIGS. 4A and 4B show SEM images of ZSM-5-S-400 and ZSM-5-M-400 (both with a scale of 2 μm). As can be seen from FIGS. 2A, 2B, 3A, 3B, 4A and 4B, the morphology of ZSM-5 molecular sieve prepared by an ordinary stirring method is significantly different from that prepared by the rotating micro liquid membrane reactor. The particle size of ZSM-5 molecular sieve prepared by an ordinary stirring method is large and has poor uniformity, while the particle size of ZSM-5 molecular sieve prepared by the rotating micro liquid membrane reactor is smaller and has excellent uniformity.

Figure 5A:
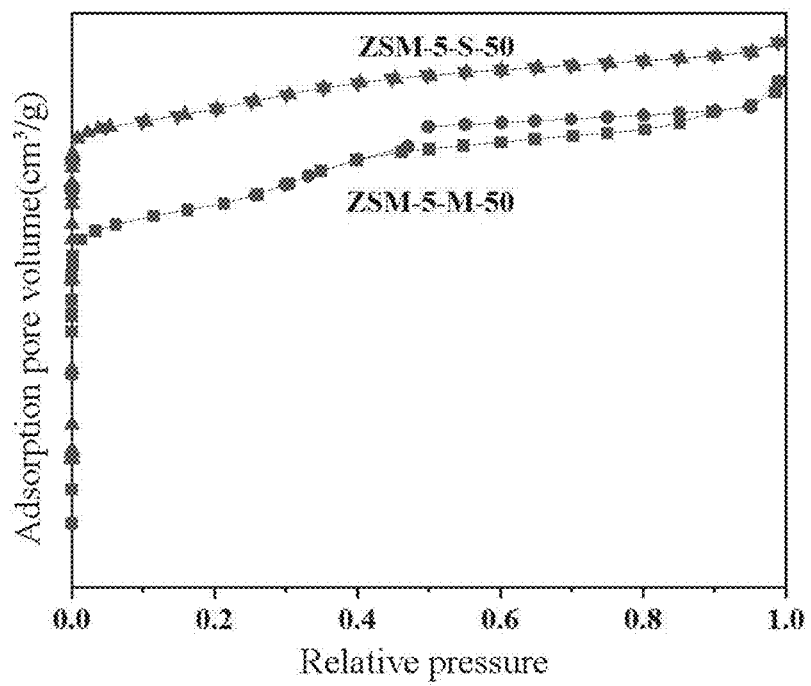
FIG. 5A shows $N_2$ adsorption-desorption curves of ZSM-5-S-50 and ZSM-5-M-50.
Figure 5B:
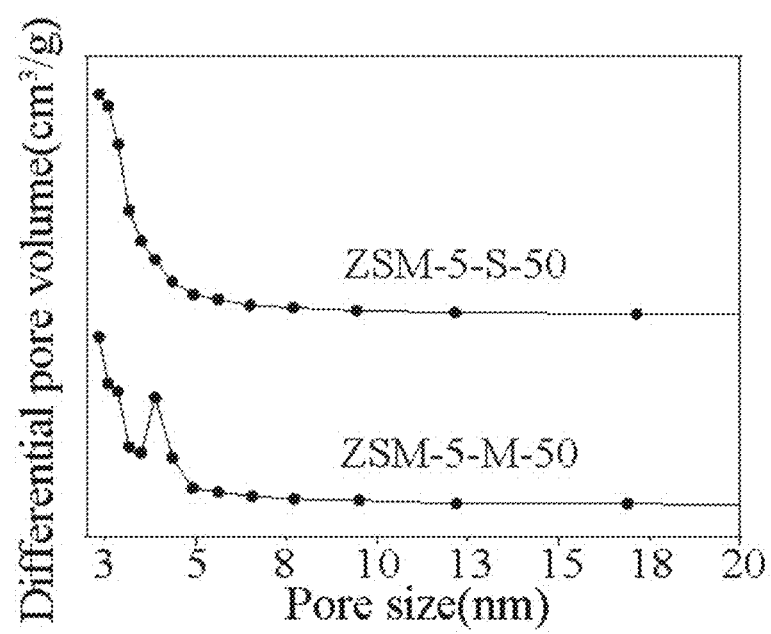
FIG. 5B shows pore size distributions of ZSM-5-S-50 and ZSM-5-M-50.

FIG. 5A shows $N_2$ adsorption-desorption curves of ZSM-5-S-50 and ZSM-5-M-50, and FIG. 5B shows pore size distributions of ZSM-5-S-50 and ZSM-5-M-50. As can be seen from FIGS. 5A and 5B, the ZSM-5-M-50 has a isothermal curve basically of IUPAC IV type, and its adsorption process is mainly completed under a P/P° equal to or less than 0.2, indicating that there are uniform micropores in ZSM-5 molecular sieve-50, and the H4 hysteresis loop in the isothermal curve indicates the coexistence of micropores and slit mesopores. The pore site distribution curve calculated by a Barrett-Joyner-Halenda (BJH) method shows that ZSM-5-M-50 has a mesoporous structure with the most probable pore size of 3.89 nm. However, the ZSM-5-S-50 has an isothermal curve of a typical IUPAC I type, which is a typical adsorption-desorption isotherm of microporous molecular sieve, and has a pore size equal to or less than 2 nm.

Figure 6A:
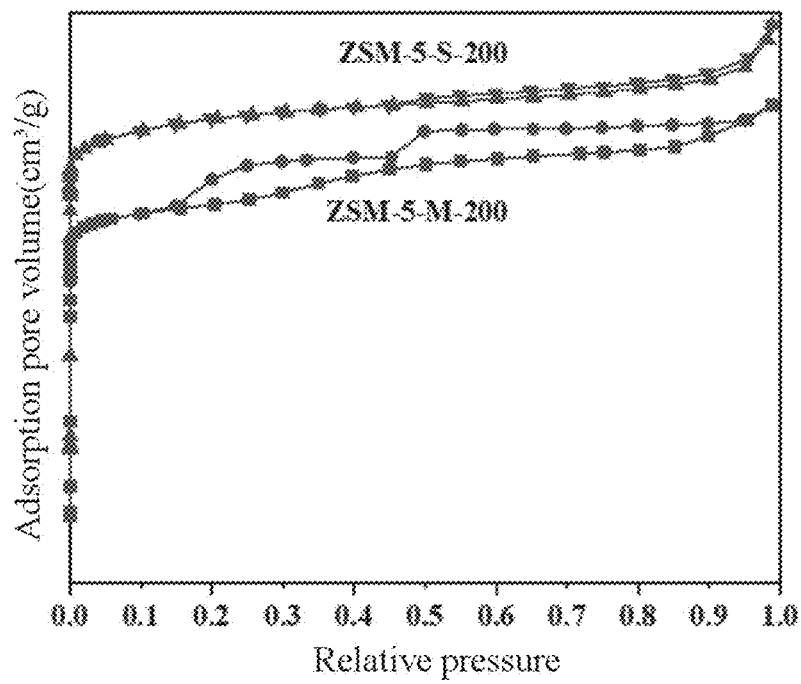
FIG. 6A shows $N_2$ adsorption-desorption curves of ZSM-5-S-200 and ZSM-5-M-200.
Figure 6B:
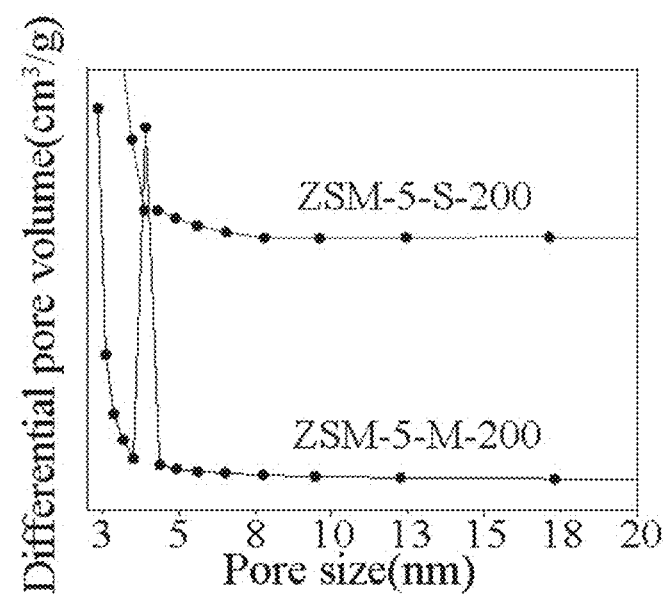
FIG. 6B shows pore size distributions of ZSM-5-S-200 and ZSM-5-M-200.

FIG. 6A shows $N_2$ adsorption-desorption curves of ZSM-5-S-200 and ZSM-5-M-200, and FIG. 6B shows pore size distributions of ZSM-5-S-200 and ZSM-5-M-200. As can be seen from FIGS. 6A and 6B, the ZSM-5-M-200 has a isothermal curve basically of IUPAC IV type, and its adsorption process is mainly completed under a P/P° equal to or less than 0.2, indicating that there are uniform micropores in ZSM-5-M-200 molecular sieve, and the H4 hysteresis loop in the isothermal curve indicates the coexistence of micropores and slit mesopores. The pore size distribution curve calculated by a Barrett-Joyner-Halenda (BJH) method shows that ZSM-5-M-200 has a mesoporous structure. However, the ZSM-5-S-200 has an isothermal curve of a typical IUPAC I type, which is a typical adsorption-desorption isotherm of microporous molecular sieve, and has a pore site equal to or less than 2 nm.

Figure 7A:
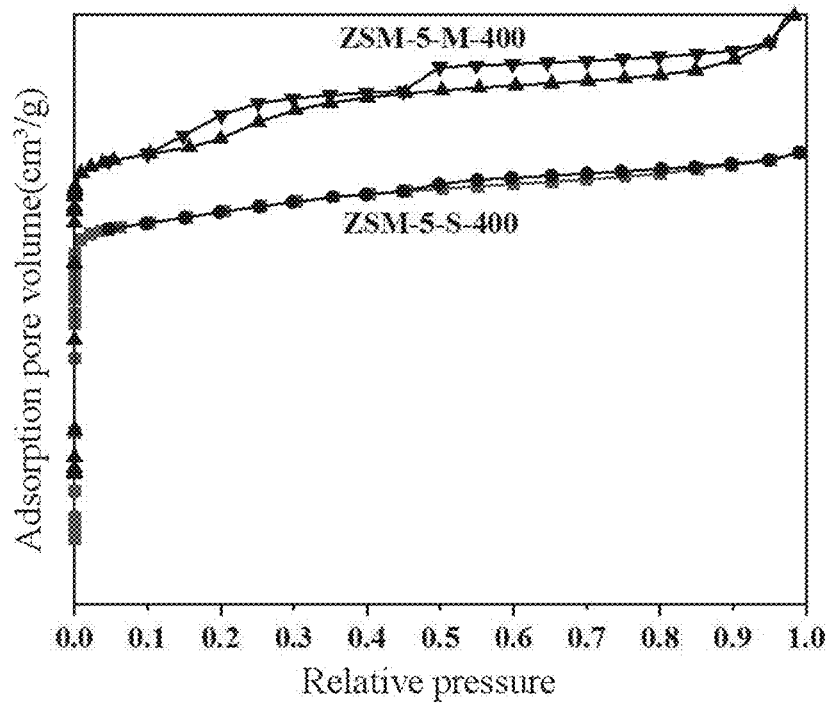
FIG. 7A shows $N_2$ adsorption-desorption curves of ZSM-5-S-400 and ZSM-5-M-400.
Figure 7B:
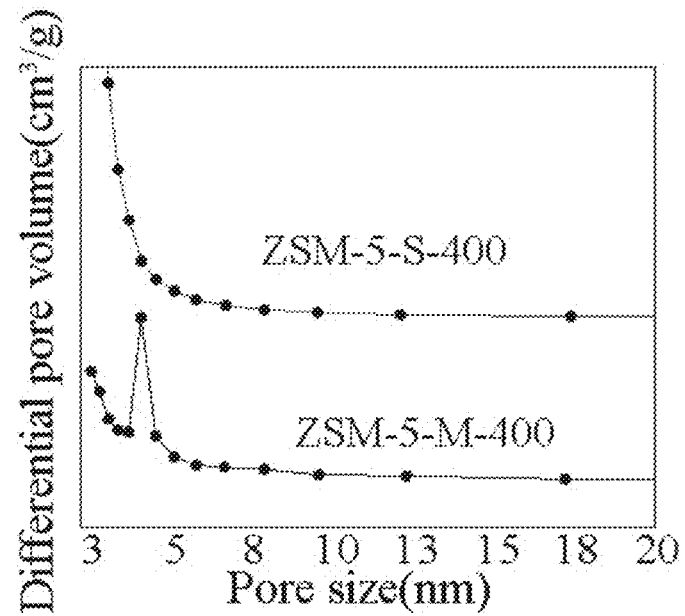
FIG. 7B shows pore size distributions of ZSM-5-S-400 and ZSM-5-M-400.

FIG. 7A shows $N_2$ adsorption-desorption curves of ZSM-5-S-400 and ZSM-5-M-400, and FIG. 7B shows pore size distributions of ZSM-5-S-400 and ZSM-5-M-400. As can be seen from FIGS. 7A and 7B, the ZSM-5-M-400 has a isothermal curve basically of IUPAC IV type and its adsorption process is mainly completed under a P/P° equal to or less than 0.2, indicating that there are uniform micropores in ZSM-5-M-400 molecular sieve, and the H4 hysteresis loop in the isothermal curve indicates the coexistence of micropores and slit mesopores. The pore size distribution curve calculated by a Barrett-Joyner-Halenda (BJH) method shows that ZSM-5-M-400 has a mesoporous structure. While the ZSM-5-S-400 has an isothermal curve of a typical IUPAC I type, which is a typical adsorption-desorption isotherm of microporous molecular sieve, and has a pore size equal to or less than 2 nm.

The foregoing descriptions are merely preferred embodiments of the present disclosure. It should be noted that those of ordinary skill in the art may make a number of improvements or refinements without departing from the principle of the present disclosure. These improvements or refinements shall also fall within the scope of the present disclosure.

What is claimed is:

1. A method for preparing a ZSM-5 molecular sieve, comprising steps of mixing a silicon source, an aluminum source, sodium hydroxide, a template and water in a rotating micro liquid membrane reactor to obtain an initial gel; and
   subjecting the initial gel to a hydrothermal crystallization to obtain the ZSM-5 molecular sieve.

2. The method of claim 1, wherein the template comprises tetrapropylammonium hydroxide.

3. The method of claim 1, wherein the mixing of the silicon source, the aluminum source, sodium hydroxide, the template and water in the rotating micro liquid membrane reactor is performed by a first mixing of the aluminum source, sodium hydroxide, the template and water to obtain an aluminum source mixed solution, and introducing the aluminum source mixed solution and the silicon source into the rotating micro liquid membrane reactor and performing a second mixing.

4. The method of claim 3, wherein a flow rate of the aluminum source mixed solution into the rotating micro liquid membrane reactor is in a range of 30-200 ml/min, and a flow rate of the silicon source into the rotating micro liquid membrane reactor is in a range of 30-200 ml/min.

5. The method of claim 4, wherein the hydrothermal crystallization is performed at a temperature of 150-220° C. for 6-48 h.

6. The method of claim 3, wherein the second mixing is performed at a rotational speed of 3000-6000 rpm for 2-10 min.

7. The method of claim 6, wherein the hydrothermal crystallization is performed at a temperature of 150-220° C. for 6-48 h.

8. The method of claim 1, wherein the hydrothermal crystallization is performed at a temperature of 150-220° C. for 6-48 h.

* * * * *